UNITED STATES PATENT OFFICE.

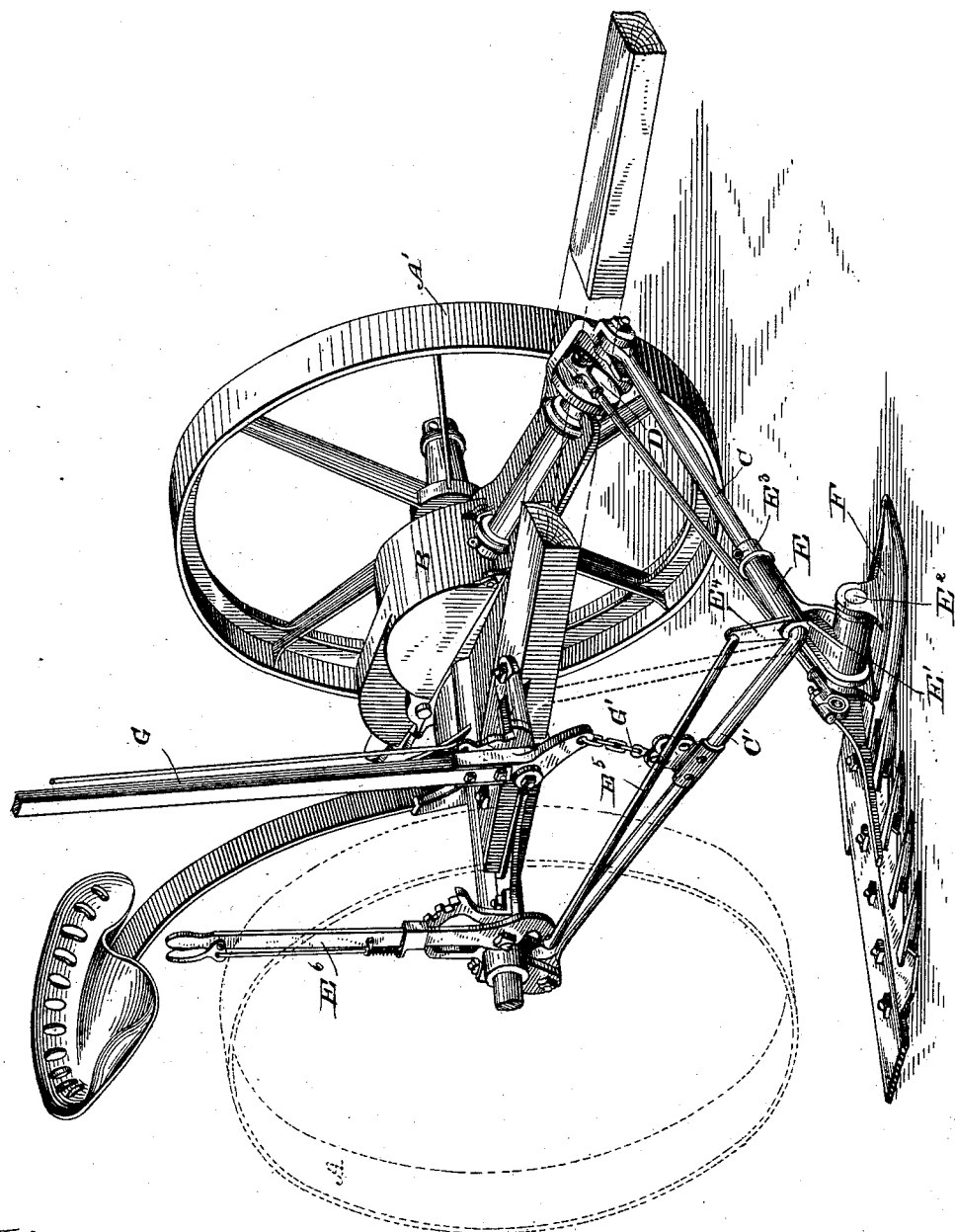

ORVILLE COOLEY, OF BATAVIA, NEW YORK.

MOWING-MACHINE.

SPECIFICATION forming part of Letters Patent No. 472,654, dated April 12, 1892.

Application filed January 4, 1889. Serial No. 295,458. (No model.)

*To all whom it may concern:*

Be it known that I, ORVILLE COOLEY, a citizen of the United States, residing at Batavia, in the county of Genesee and State of New York, have invented certain new and useful Improvements in Mowers, of which the following is a full, clear, and exact specification, reference being had to the accompanying drawing.

My invention relates to the type of machine represented in United States Patent No. 196,238, dated October 16, 1877, to Lowthe, Howe, and Lebar, and has as its object the simplification of the coupling-frame and connected parts by which the main frame and the cutting mechanism are united. In this form of machine the main shoe carrying the finger-bar is connected by a horizontal fore-and-aft hinge-pin to a so-called "hinge-block," which is in turn connected to the coupling-frame by an axis lying in the direction of the length of the finger-bar, to the end that the bar may be rocked or rolled forward and backward to change the height of cut. It is necessary that this transverse axis shall be of considerable length and that it shall be firmly sustained to prevent the finger-bar from swinging backward at its outer end. I therefore construct my coupling-frame in one piece by bending a metal bar or rod, preferably of round section, in such manner that it presents two arms for connection to the main frame, the front arm being arranged transversely to the line of travel and passed through a long sleeve on the hinge-block to serve as the journal or axis therefor, while the rear arm is carried back to the main frame to serve the purpose of the usual thrust-bar.

I am aware that a coupling-frame has been made in one piece, of angular form, and used to connect the shoe directly with the main frame; but the form was not such as to permit its use as a journal for the hinge-block, nor was a hinge-plate mounted thereon. For the purposes which I have in view the coupling-frame must present the round journal lying at practically right angles to the line of travel and adapted to allow the sleeve of the hinge-block to slide endwise to its place thereon and to turn freely when in place.

The drawing represents in perspective a machine containing my improvement, the construction being in all other respects of ordinary character.

A A' are the main wheels, sustaining the main frame B, which latter will bear the usual gearing and the crank-shaft D, which communicates motion to the reciprocating knife, as usual.

The cutting mechanism consists of the usual finger-bar provided with the knife and bolted rigidly to the main shoe F. This shoe is connected by the fore-and-aft hinge-pin $E^2$ to the hinge-block E'. This block is formed, as shown, with a fore-and-aft sleeve to receive the hinge-pin and with the long sleeve E at right angles to the hinge-pin.

My coupling-frame comprises the two arms C and C' at substantially right angles to each other, and is produced by bending a suitable rod or bar. The front arm C is passed through the sleeve E of the hinge-block from the outer or grass end, and is provided at its end with an eye to receive a horizontal pivot $c$, connecting it to the main frame near the front of the stubble side wheel. The arm C', which retains the sleeve upon arm C, is continued rearward, provided with an eye, and jointed to the main frame either directly behind the shoe, as shown in full lines, or at a point directly in rear of pivot C, as indicated in dotted lines. A collar $E^3$ is pinned to arm C to prevent end motion of the hinge-block thereon; but the hinge-block is free to rotate in order to throw the front of the cutting devices up or down.

The devices for lifting and for rocking the cutting mechanism may be of any appropriate construction. I prefer to attach the rocking bar $E^5$ at one end to a rigid arm $E^4$ on the hinge-block and at the other end to the lower extremity of a hand-lever $E^6$, pivoted to the main frame and provided with ordinary locking devices.

For lifting the cutting mechanism I prefer to mount on the main frame a hand-lever G and to connect the same by chain G' to the rear arm C' of the coupling-frame.

Having thus described my invention, what I claim is—

1. In a mower, the main frame, the continuous angular coupling-frame jointed at its ends thereto, the hinge-block mounted to turn on the transverse arm of the coupling-frame as a journal and fixed against end motion thereon, and the main shoe connected to the hinge-block by the fore-and-aft axis.

2. In combination with the main frame, the shoe, and the hinge-block having the sleeve transverse to the line of travel, and the coupling-frame formed in a continuous length, its front arm extended through said sleeve from the grass end and joined to the frame and its rear arm carried backward and jointed to the frame.

3. In combination with the main frame, the one-piece L-shaped coupling-frame jointed at its ends to the main frame, and the hinge-block to sustain the cutting mechanism, mounted to turn on the transverse arm of the coupling-frame as a journal.

4. The mower coupling-frame having the integral arms at substantially right angles to each other, each arm having a pivot-bearing at the end and the arm C having its inner end of cylindrical form to serve as a journal for the hinge-plate.

ORVILLE COOLEY.

Witnesses:
G. W. Ford,
F. W. Ballard.